United States Patent [19]

Schmitt

[11] 4,142,599

[45] Mar. 6, 1979

[54] VEHICLE

[76] Inventor: Robert J. Schmitt, Box 92, Spillville, Iowa 52168

[21] Appl. No.: 838,740

[22] Filed: Oct. 3, 1977

[51] Int. Cl.² ............................................. B62D 61/04
[52] U.S. Cl. ...................... 180/21; 160/134; 280/703; 293/126; 296/69; 296/137 B
[58] Field of Search ............................. 180/21, 2, 90.6; 293/17, 19, 20, 73, 89, 62; 280/703; 160/134, 188, 84 R; 52/82, 83, 64, 66; 4/172.12, 172.14; 297/354; 5/329; 296/69, 137 B

[56] References Cited
U.S. PATENT DOCUMENTS

| | | | |
|---|---|---|---|
| 1,609,877 | 12/1926 | Kendall | 160/134 |
| 2,005,400 | 6/1935 | Stoehrer et al. | 180/2 |
| 2,289,907 | 7/1942 | Friedlaender | 280/703 |
| 2,398,541 | 4/1946 | Leach | 180/21 |
| 2,660,734 | 12/1953 | Dumble et al. | 297/354 |
| 2,840,411 | 6/1958 | Mason | 293/20 |
| 3,236,539 | 2/1966 | Ketterer | 280/491 A |
| 3,288,158 | 11/1966 | Gugluiotta | 52/83 |
| 3,288,239 | 11/1966 | Ristau | 180/90.6 |

*Primary Examiner*—Joseph F. Peters, Jr.
*Assistant Examiner*—Donn McGiehan
*Attorney, Agent, or Firm*—Zarley, McKee, Thomte, Voorhees & Sease

[57] ABSTRACT

The vehicle of the present invention has an ovular shape and is supported by four wheels which are arranged with one wheel in the forward position, one wheel in the rearward position, and two wheels at the lateral sides of the vehicle. A flexible bumper surrounds the vehicle and is rotatably mounted by bearing means to the vehicle so that the bumper can rotate with respect to the vehicle. The vehicle includes a folding shutter roof and seats which can fold up to form a bed for sleeping. The vehicle includes a tow bar which is retractable, and further includes means associated with the front wheel for minimizing the tendency of the vehicle to dip adjacent the forward end thereof whenever braking occurs.

7 Claims, 9 Drawing Figures

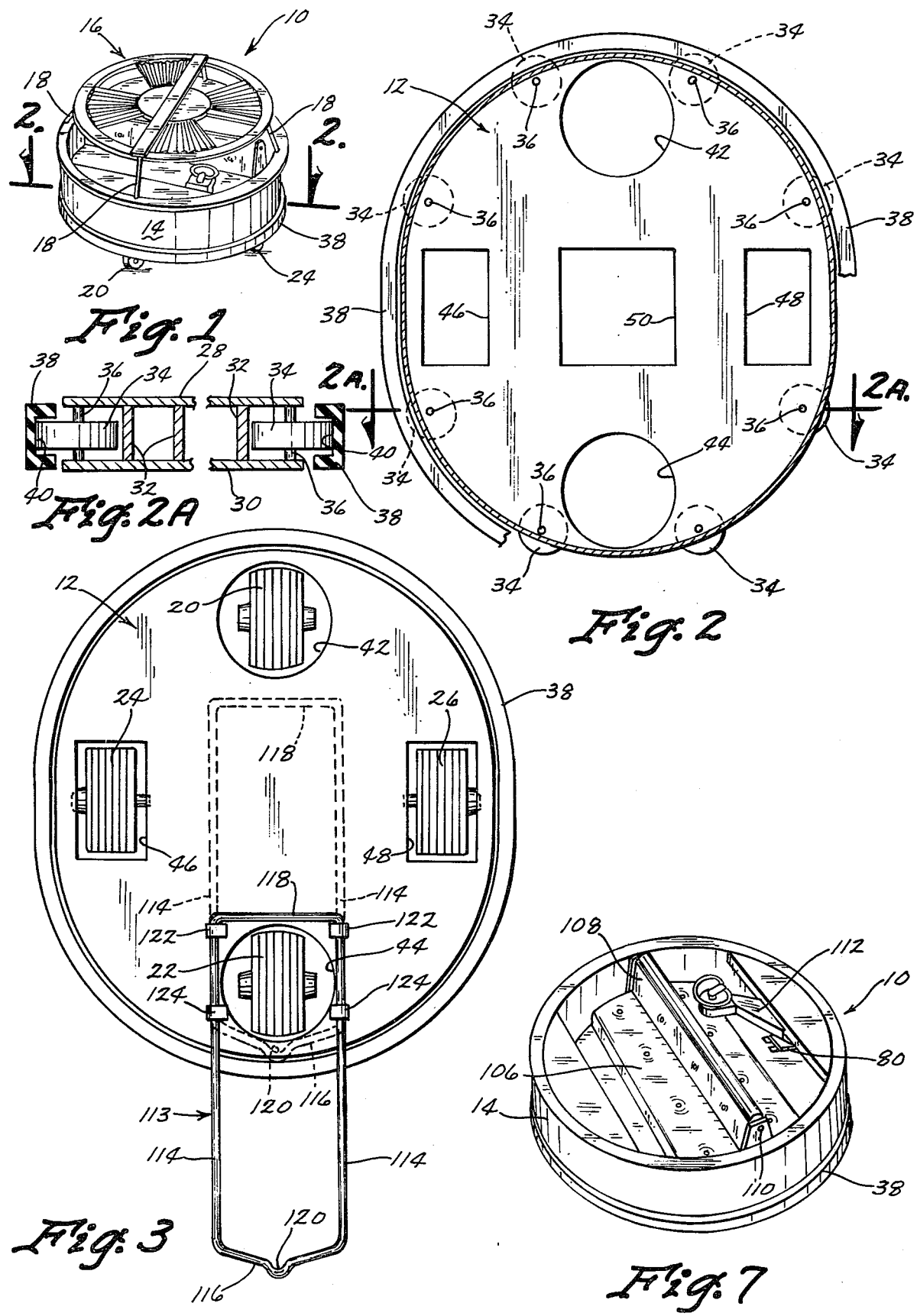

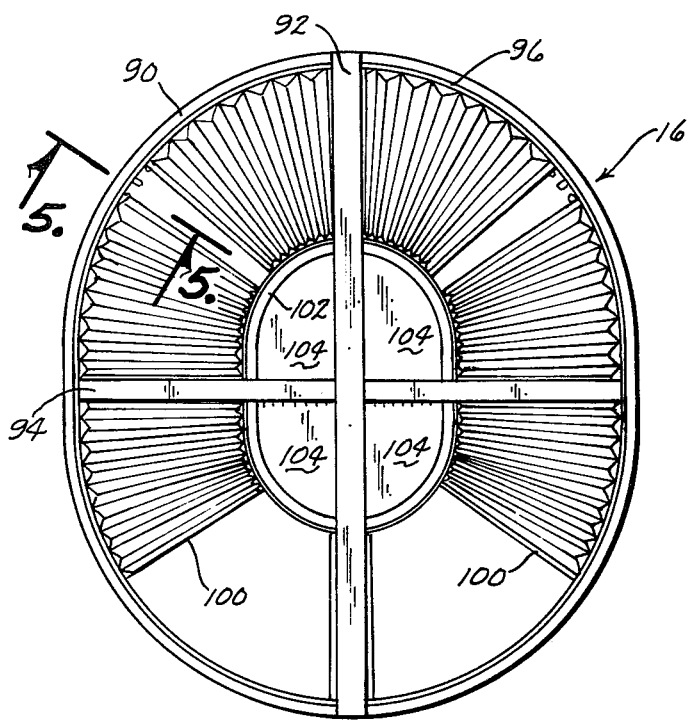
Fig. 4
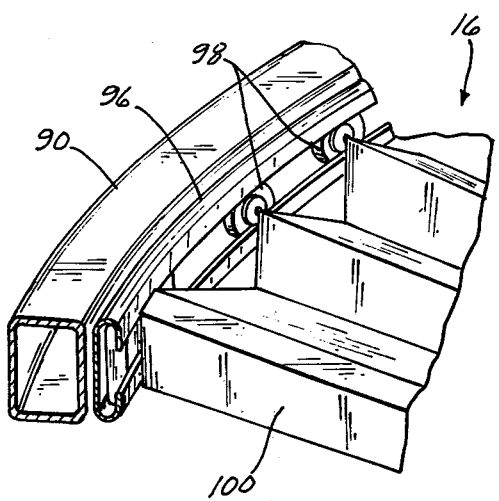
Fig. 5
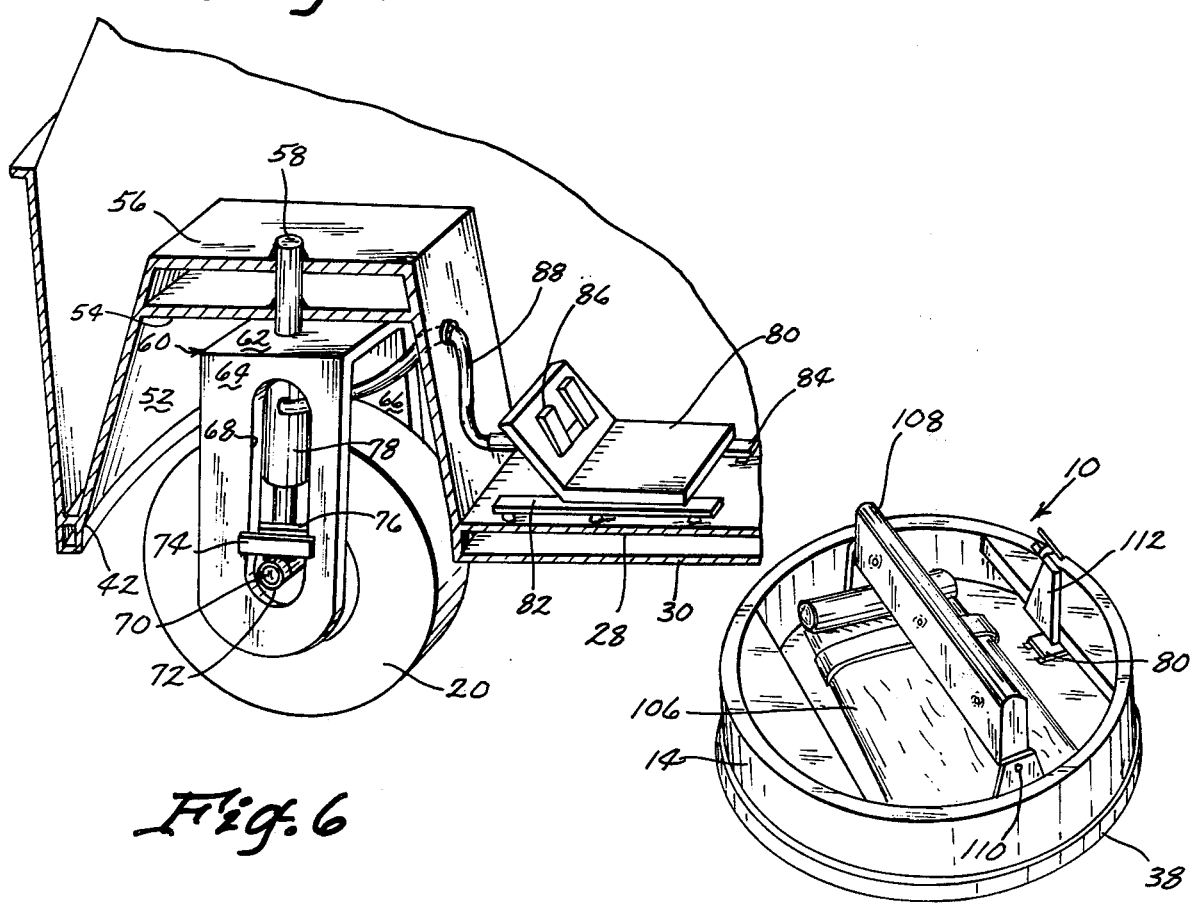
Fig. 6
Fig. 8

VEHICLE

BACKGROUND OF THE INVENTION

This invention relates generally to vehicles.

Conventional vehicles are of rectangular configuration having four wheels at the four rectangular corners thereof. These vehicles are incapable of short turns and are susceptible to tipping or rolling in response to lateral forces thereon.

Among present vehicles there have been many efforts to design bumpers which absorb or deflect the impact which occurs during collisions. Also, when conventional vehicles stop they tend to dip or lower adjacent the front end thereof. There is a further need in the present vehicles for folding seats which can be adaptable to overnight sleeping in the vehicles.

Conventional vehicles utilize adjustable seats which may be moved with respect to the foot controls to adjust for varying sized operators. This arrangement presents a problem in designing the seat in such a manner that it will resist the forces necessary to be safe during a collision.

SUMMARY OF THE INVENTION

The present invention overcomes many of the problems in conventional vehicles which are set forth above. The invention includes a circular or ovular frame having a wheel system which increases the stability of the vehicle. The wheel system includes a forward wheel adjacent the forward end of the oval, two lateral wheels adjacent the lateral sides of the oval, and a rearward wheel adjacent the rearward end of the vehicle. The vehicle is capable of making a 360° turn without making any forward progress, a feature which is not possible with present vehicles.

The present invention also utilizes a rotary bumper which tends to rotate in response to impactive forces. The roof of the vehicle includes a folding sun visor which is attractive and convenient. The interior of the vehicle includes a seat which is foldable easily into a bed for sleeping at night.

The foot pedal control board of the present vehicle is movable with respect to the seat, thereby making possible the rigid connection of the seat to the vehicle frame for safety purposes.

Another feature of the present invention pertains to the means for preventing the dipping tendency of the vehicle in response to fast stopping or braking. The hydraulic cylinder is associated with the front wheel and also with the brake pedals.

Upon depression of the brake pedal, the hydraulic cylinder expands thereby minimizing the tendency of the vehicle to dip adjacent the forward end thereof during braking.

Another feature of the present invention is the provision of a retractable tow bar on the underside of the vehicle.

Therefore, a primary object of the present invention is the provision of a vehicle which has improved stability and maneuverability by virtue of the wheel arrangement and the shape of the vehicle.

A further object of the present invention is the provision of a vehicle having a bumper thereon which can absorb or deflect impactive forces in a superior manner over that obtained with present devices.

A further object of the present invention is the provision of a device having foldable seats which are covnenient for overnight sleeping.

A further object of the present invention is the provision of a vehicle having a mechanism adjacent the forward end thereof which will inhibit or counteract the dipping action of the front of the vehicle during braking.

A further object of the present invention is the provision of a vehicle having a short turning radius.

A further object of the present invention is the provision of a vehicle having controls which are adjustably movable toward and away from the seat occupied by the operator.

A further object of the present invention is the provision of a vehicle having a convenient retractable tow bar.

A further object of the present invention is the provision of a vehicle having an attractive and convenient sun visor.

A further object of the present invention is the provision of a vehicle which is attractive in appearance, durable in use, and economical to manufacture.

BRIEF DESCRIPTION OF THE DRAWINGS

FIG. 1 is a perspective view of the vehicle of the present invention.

FIG. 2 is a sectional view taken along line 2—2 of FIG. 1.

FIG. 2a is a sectional view taken along line 2a—2a of FIG. 2.

FIG. 3 is a bottom view of the vehicle.

FIG. 4 is a top view of the vehicle.

FIG. 5 is a detailed enlarged perspective view of the sun visor of the roof of the vehicle.

FIG. 6 is a detailed perspective view of the front wheel assembly.

FIGS. 7 and 8 are perspective views of the interior of the vehicle showing the roof removed.

DETAILED DESCRIPTION OF THE DRAWINGS

Referring to FIG. 1, the numeral 10 generally designates the vehicle of the present invention. Vehicle 10 comprises a floor frame 12 (FIGS. 2 and 3) side walls 14, a roof 16, support members 18 which hold the roof in spaced relation above side walls 14, and four wheels including a front wheel 20, a rear wheel 22, and two side wheels 24, 26.

Floor frame 12 is comprised of upper and lower sheet members 28, 30 which are held together in spaced apart relationship by means of a plurality of ribs or reinforcing members 32. Journaled between sheet members 28, 30 around periphery thereof are a plurality of bearings 34, each of which is pivotal about a vertical axis provided by pin 36. Bearings 34 protrude slightly beyond the outer peripheral edges of sheet members 28, 30.

Extending around the outer peripheral edge of floor frame 12 is a flexible bumper 38. Bumper 38 extends continuously around the outer periphery of floor frame 12 and includes a C-shaped cross section which forms an inwardly presented groove 40 adapted to retentively engage bearings 34. Bumper 38 may be constructed of a flexible material such as rubber, plastic or the like, and is adapted to be rotatable around the circumference of floor frame 12 as the result of its bearing engagement with bearings 34. Thus, when an impactive force is received on bumper 38, the tendency will be for bumper 38 to slip or deflect in one direction or the other, thereby causing the object which impacts bumper 38 to be deflected laterally so as to minimize the impactive effect on the vehicle 10.

Floor frame 12 includes apertures therein which form forward and rearward wheel wells 42, 44, and lateral wheel wells 46, 48. It should be noted that forward and rearward wheel wells 42, 44 are circular so as to provide room for permitting forward and rearward wheels 20, 22 to rotate about a vertical axis for turning the vehicle. Adjacent the center of floor frame 12 is an engine opening 50 for receiving an engine (not shown) for driving the vehicle.

Referring to FIG. 6, forward wheel well 42 includes side walls 52 and a pair of spaced apart top walls 54, 56, all rigidly interconnected and integral with floor frame 12. Rigidly secured to top walls 54, 56 is a vertical collar 58 adapted to receive for rotatable movement a vertically extending pin (not shown) mounted on the upper end of a yoke 60. Yoke 60 comprises a horizontal web 62 and two downwardly spaced apart legs 64, 66. Legs 64, 66 are provided with a vertical slot 68 therein. Yoke 60 is adapted to rotate about the vertical axis provided by the pin thereof (not shown) which is rotatably received within vertical collar 58.

Wheel 20 is rotatably mounted upon a wheel axle 70 which in turn is rotatably received within a collar 72. Collar 72 is welded or otherwise fixed to a pair of spaced apart slide members 74, 76 which embrace the opposite sides of leg 64 so as to permit vertical sliding movement of axle 70 within slot 68. A hydraulic cylinder 78 is connected at its upper end to web 62 of yoke 60 and at its lower end to axle 70. Extension of cylinder 78 causes wheel 20 to be lowered, and retraction of cylinder 78 causes wheel 20 to be raised.

A foot pedal control board 80 is mounted within vehicle 10 on the floor thereof for sliding movement by means of tracks 82, 84. Conventional means may be used to lock board 80 against sliding movement selectively so that board 80 may be adjustably moved to the desired position for the operator's feet.

The numeral 86 designates the brake pedal which is operatively connected to hydraulic cylinder 78 by means of a hydraulic line 88.

Depression of brake pedal 86 causes cylinder 78 to expand thereby lowering wheel 20, or conversely raising frame 12 with respect to the ground. Thus, whenever foot pedal 86 is depressed, cylinder 78 counteracts the tendency of the vehicle to dip or drop adjacent the forward end thereof.

Referring to FIGS. 4 and 5, the roof 16 of the vehicle 10 comprises an ovular tube frame 90 and two cross frame members 92, 94 which extend across the major and minor diameters of the oval formed by tube 90. Operatively secured around the inner perimeter of tube 90 are four track segments 96, each of which extends around the circumference of one quadrant of the oval formed by frame 90. Track segments 96 are C-shaped in cross section and are adapted to receive a plurality of rollers 98 rotatably mounted adjacent the edges of accordian like folding blinds 100.

An inner ovular tube 102 is also secured to cross frame members 92, 94 in concentric relation to outer tube member 90. The exterior surface of inner tube 102 is provided with a track identical to track 96 so as to receive rollers on the inner edges of blinds 100. The tracks and rollers on the inner edge of blinds 100 are identical to those on the outer edge as shown in FIG. 5.

The space on the interior of inner ovular tube 102 is filled by four plates 104.

Referring to FIGS. 7 and 8, a seat platform 106 is provided within the interior of vehicle 10. Extending upwardly above seat platform 106 is a back rest 108 which is pivotally mounted, its upper end for movement about a horizontal axis 110 for movement from a position shown in FIG. 7 to a position shown in FIG. 8. When back rest 108 is in a position shown in FIG. 7, platform 106 extends outwardly from opposite sides thereof, and passengers may sit on both sides of and lean against back rest 108. In the position shown in FIG. 8, back rest 108 is pivoted upwardly so that the entire platform 106 is exposed and may be used as a bed. Steering column 112 may also be foldable out of the way as shown in FIG. 8.

Referring to FIG. 3, a tow bar is provided on the under surface of vehicle 10. The tow bar 113 includes a pair of spaced apart rails 114 which are interconnected at their opposite ends with a forward cross rail 116 and a rearward cross rail 118. A hitch 120 is provided in forward cross rail 116 and while shown to be hook or nodule in rail 116, hitch 120 may be of any conventional construction. Two pair of slide brackets 122, 124 are fixed to the undersurface of frame 12 and slidably receive side rails 114 of tow bar 113. Tow bar 113 may slide from an extended position shown in FIG. 3 to a retracted position shown by the shadow lines in FIG. 3.

Thus, it can be seen that the device accomplishes at least all of its stated objectives. The novel arrangement of the wheels provide a stability to the vehicle which is superior to that obtained in presently known vehicles. The two lateral side wheels 24 inhibit the tendency of the vehicle to tip over in a lateral direction. Similarly, the vehicle may turn without making any forward progress, merely by rotating front and rear wheels 20, 90° from the position shown in FIG. 3 so that all four wheels are in a position perpendicular to a radius of the vehicle. This will permit the vehicle to rotate without making any forward progress.

The body of vehicle 10 may be constructed of various materials including metal, fiberglass, fiberglass impregnated wood and the like. The sandwich construction of frame floor 12 together with the elyptical shape of sidewalls 14 minimize the need for large and cumbersome frame members used in present vehicles.

The vehicle may be powered by various conventional power systems. A hydraulic system may be used to avoid the need for the usual expensive mechanism of clutch, transmission, drive shaft, differential and shifting mechanism. Such a hydraulic system would incorporate hydraulic motors for each wheel powered by pumps coupled to a conventional power source such as a piston engine. Electric motors could be used in the place of hydraulic motors to achieve the same advantage.

The "anti-dive" mechanism for front wheel 20 as shown in FIG. 6 may also be used for rear wheel 22 to eliminate "dive" during hard backward backing.

The novel rotating bumper 38 provides means for absorbing or deflecting the impact resulting from collisions. The foldable seat back rest 108 and platform 106 provides means for conveniently converting the vehicle so that the occupants may sleep or rest therein. The hydraulic cylinder adjacent the forward wheel well prevents the dipping of the vehicle when braking is applied. The controls may be easily adjusted with respect to the seat without moving the seat, thereby permitting the seat to be more rigidly secured to the vehicle for safety purposes.

The present invention includes an attractive sun visor which may be easily opened and closed. The vehicle is economical to manufacture, durable in use and attractive in appearance.

What is claimed is:

1. A vehicle comprising:
   a vehicle frame having an ovular shape and having forward and rearward ends and lateral sides;
   four wheels rotatably mounted to said frame for supporting said frame for rolling engagement with the ground, said wheels being positioned with one forward wheel adjacent said forward end of said frame, two lateral wheels adjacent said lateral sides of said frame, and one rearward wheel adjacent said rearward end of said frame;
   means mounting said forward and rearward wheels to said frame for pivotal steering movement about a vertical axis from a first position wherein said forward and rearward wheels are parallel to said lateral wheels to a second position wherein said forward and rearward wheels are perpendicular to said lateral wheels whereby said vehicle may rotate about a single point when said wheels are in said second position;
   a super structure above said vehicle frame forming a passenger compartment, said super structure comprising side walls, a roof, and support members attaching said roof to said side walls in spaced relation thereabove;
   bumper means completely surrounding said frame, said bumper means having an inner circumferential surface facing radially inwardly toward the ovular frame around the entire circumference of said frame and an outer circumferential surface presented radially outwardly away from said frame;
   bearing means between said bumper means and said frame for permitting said bumper means to rotate in a circumferential direction around said frame;

2. A vehicle according to claim 1 wherein a passenger seat is provided within said compartment, said passenger seat comprising a vertical back rest and a horizontal sitting platform positioned below said back rest and protruding outwardly beyond the opposite sides of said back rest, said back rest being pivotal about a horizontal axis adjacent the upper end thereof from a first position wherein the lower edge of said back rest is adjacent said sitting platform to a second position wherein said lower edge is pivoted upwardly away from said platform.

3. A vehicle according to claim 1 wherein said roof comprises an inner continuous track and an outer continuous track concentrically oriented with respect to one another, a folding visor having rollers at opposite edges thereof, said rollers being retentively engaged within said inner and outer tracks to permit folding and unfolding of said visor from a folded position exposing the interior of said compartment to the exterior light to an unfolded position wherein said visor is in covering relation over said compartment.

4. A vehicle according to claim 1 wherein a brake pedal is operatively connected to a braking system for stopping said vehicle, said forward wheel being rotatably mounted on a horizontal axle, a hydraulic cylinder having an upper end connected to said frame and a lower end connected to said axle, said cylinder being hydraulically connected to said brake pedal whereby depression of said brake pedal causes longitudinal extension of said cylinder.

5. A vehicle according to claim 2 comprising a foot pedal control board movably mounted to said frame within said compartment, said control board being adjustably movable toward and away from said seat, said control board carrying foot pedal controls for operating said vehicle.

6. A vehicle according to claim 1 wherein a tow bar is mounted to the under surface of said frame, said tow bar being elongated having an inner end and a hitch end, means mounting said tow bar to said frame for sliding movement from a first position wherein said tow bar is completely beneath said frame to a second position wherein said hitch end of said tow bar protrudes outwardly beyond the perimeter of said frame, stop means on said tow bar for limiting the sliding movement of said bar beyond said second position.

7. A vehicle according to claim 1 wherein said bearing means comprises a plurality of wheels rotatably mounted about vertical axes to said ovular frame at spaced apart positions around the periphery thereof, said wheels having circumferential edges protruding radially outwardly beyond the outer periphery of said ovular frame, said bumper means having an annular groove extending around said inner circumferential surface thereof, said annular groove retentively engaging said edges of said rollers for rolling movement thereon.

* * * * *